Patented Sept. 20, 1938

2,130,800

UNITED STATES PATENT OFFICE 2,130,800

HYDROGENATED RESINS

Harold S. Holt, Wilmington, Del., assignor to E. I. du Pont de Nemours & Company, Wilmington, Del., a corporation of Delaware No Drawing. Application November 24, 1937, Serial No. 176,231

13 Claims. (Cl. 260—2)

This invention relates to the manufacture of resinous materials and more particularly to the preparation of artificial resins, both liquid and solid, which are resistant to deterioration by the action of light and heat.

U. S. Patent No. 2,055,708 describes the preparation and properties of certain resinous materials which may be made from dihydronaphthalene and homologues thereof. These resinous products may be prepared by subjecting, for example, 1,2-dihydronaphthalene, 1,4-dihydronaphthalene or a mixture thereof of the action of a solution of the alkali metal addition compound of naphthalene or other polycyclic aromatic hydrocarbon, as described in the above mentioned patent. The resinous product is recovered by distilling off solvent and unpolymerized material.

These resinous materials described in Patent No. 2,055,708 are polymers of the hydrocarbons from which they are made; for example, those made from dihydronaphthalene are polymers of 1,2-dihydronaphthalene or 1,4-dihydronaphthalene or mixtures of these. The polymers are liquid or solid, depending on the degree of polymerization. For example, the dimer of 1,4-dihydronaphthalene is a viscous liquid at room temperature, while the tetramer is a brittle solid. These resinous materials, like resins in general, do not have the definite, sharp melting points characteristic of crystalline compounds, but gradually change from the solid state to viscous liquid when suitably heated, the viscosity of the melt slowly decreasing as the temperature is raised. The term "melting point" or "apparent melting point", as used herein with reference to these resinous materials, and also to the products of the present invention hereinafter described, refer to the temperature at which apparent liquefaction commences. Such apparent melting point is determined by a standardized procedure known as the "cube melting point method", which is generally applicable to various resinous substances. In this method a ½ inch cube of the resin is cast in a mold on the end of a brass wire 0.1 inch in diameter. The wire is bent at right angles one inch from the end on which the cube is cast, the end of the wire extending through the center of the cube. When the cast cube has solidified, it is removed from the mold and, while still hot, is suspended one inch below the surface of a body of mercury which has been heated to 60 to 90° C., the main portion of the suspending wire being in a vertical position. The mercury is then heated at the rate of 3° C. per minute until the cube appears at the surface of the mercury. The temperature of the mercury at a point near the end of the wire at the instant the cube appears at the surface, is multiplied by the arbitrary factor of 1.25 and 2° is added to the product to give the apparent melting point in degrees centigrade. For example, if the mercury temperature is 100° C. when the cube appears on the surface, the apparent melting point will be (100°×1.25) +2°, or 127° C. The melting points stated herein refer to those obtained by this method. By using as starting material different isomers or mixtures and by producing mixtures containing the different polymers, resinous materials may be obtained from dihydronaphthalene or its homologues, having different apparent melting points or different degrees of hardness or viscosity at room temperature.

The above described resinous polymers of the dihydronaphthalenes and their polymers, when freshly prepared and free from impurities, are clear, transparent and colorless. The solid forms have the appearance of colorless, crystal glass, except for a slight fluorescence. When impure, they may have a coloration varying from light yellow to amber, depending on the degree of impurity. However, these materials are more or less subject to actinic effects and usually become colored or have their color deepened on exposure to heat and light, especially ultraviolet light. In a number of uses for which such resins are well adapted, this lack of stability to light is a distinct disadvantage.

An object of the present invention is to provide means for stabilizing the above described resinous polymers of dihydronaphthalene and their homologues against actinic action. A further object is to prepare substantially transparent, colorless or light colored resinous materials which are stable to light and heat. My invention also comprises the novel resinous products obtained by my process hereinafter described. Further objects will be apparent from the following description.

The above objects are attained in accordance with the present invention by hydrogenating the above described resinous polymers of dihydronaphthalene and its homologues. I have found that the resulting hydrogenated products are very stable to light. By a proper degree of hydrogenation, I am able to produce colorless resinous materials which show no trace of color after exposure to ultraviolet light of high intensity for many hours, whereas the parent material becomes highly colored by exposure to the same light in a relatively short time.

Although the dihydronaphthalene polymers are resinous in character, I have found that they can be hydrogenated readily under suitable conditions. A method which I have found particularly effective consists in dissolving the polymer in a hydrocarbon solvent, e. g. decalin (decahydronaphthalene), an ether solvent, e. g. dimethyl ether of ethylene glycol or other suitable solvent and applying hydrogen under pressure at 200 to 300° C. in the presence of a hydrogenation catalyst, e. g., finely divided nickel. At temperatures below 200° C., the polymers absorb hydrogen relatively slowly. A preferred temperature range for rapid hydrogenation is 240 to 275° C. However, hydrogenation at temperatures below 200° C. may be carried out effectively if the reaction is continued for a sufficient length of time. Hydrogen pressures of 1000 to 2000 pounds per square inch have been found to be suitable for effective and rapid hydrogenation. The various known hydrogenation catalysts may be used, for example, finely divided nickel. A catalyst concentration of, for example, 7 to 35 grams per liter of the polymer solution is satisfactory. If desired, the polymers may be hydrogenated without the use of a solvent, by operating at temperatures at which they are in the liquid state. However, because of the viscous nature of the polymers, I prefer to hydrogenate them in solution, especially the polymers of higher molecular weight. Various modifications of the above described hydrogenating process will be apparent to those skilled in hydrogenation of organic compounds.

The hydrogenated products made by the present invention may contain three or more moles of added hydrogen ($H_2$) for each mole of dihydronaphthalene ($C_{10}H_{10}$) originally present. Thus, where a polymer having the empirical formula: $(C_{10}H_{10})_n$ is hydrogenated, the product will have the empirical formula $(C_{10}H_{10}+x)_n$, where $x$ represents a number between zero and 8. Thus, products have been obtained containing more than 3 moles of added hydrogen per mole of $C_{10}H_{10}$. The degree of hydrogenation may be varied as desired. I prefer to carry on the hydrogenation until 1 to about 3.25 moles of hydrogen per mole of $C_{10}H_{10}$ have been absorbed. The hydrogenated product is generally colorless and, when sufficiently hydrogenated, is very stable to light and heat. It has been found that the unhydrogenated polymers which are colored as produced or which have become colored or darkened by the action of heat or light are greatly improved in appearance by my hydrogenation process. Thus, a colored resin may be changed to a colorless or only very lightly colored, light-stable product by the hydrogenation. Because of this fact, my process is of value for reclaiming colored, unsalable material.

It has been found that in order to obtain a light-stable resin by my process, it is necessary to carry the hydrogenation to a relatively high degree. Thus, the introduction of 1–2 moles of hydrogen per mole of $C_{10}H_{10}$ generally does not appreciably increase the stability towards actinic action. Usually, it is necessary to introduce at least 2.5 to 3 moles of hydrogen per mole of $C_{10}H_{10}$, the minimum amount depending on the particular sample. When this minimum point is reached, the hydrogenated product is very stable towards light. I prefer to hydrogenate the material until it will absorb no more hydrogen, which corresponds to the introduction, in general, of 3 to 3.25 moles of hydrogen per mole of $C_{10}H_{10}$ in the resin.

On the other hand, the decolorizing effect described above often may be obtained by a very light hydrogenation, e. g. the introduction of 0.5 to 1 mole of hydrogen per mole of $C_{10}H_{10}$. The increase in heat stability varies directly with the degree of hydrogenation, the heat stability gradually increasing as the amount of hydrogen introduced is increased.

It has further been found that the hydrogenation increases the melting points of the polymers and the increase in melting point varies directly with the amount of hydrogen introduced. This result was surprising and unexpected, since hydrogenation of cyclic organic compounds regularly lowers the melting point. For example, naphthalene is a solid, melting at 80° C., while its hydrogenation products, dihydronaphthalene, tetrahydronaphthalene and decahydronaphthalene are all liquids at 20° C. In general, the melting point of the polymer will be increased by my process about 14° C. for each mole of hydrogen introduced per mole of $C_{10}H_{10}$. Thus my method enables the preparation of resins of different melting points, as desired, over a wide range. The hydrogenated resins made by my process may range from viscous liquids to solid materials having apparent melting points up to about 200° C. A particularly useful group of products which may thus be prepared are those having apparent melting points of 100 to 200° C. These are brittle, glass-like materials which may be utilized in a variety of resin compositions for imparting hardness to the mass.

The hydrogenated products of the present invention exhibit excellent stability toward both light and heat. For example, a clear, transparent, colorless, glass-like resin was made by hydrogenating the tetramer of 1,4-dihydronaphthalene until hydrogen absorption was substantially complete, the amount of hydrogen absorbed being equivalent to about 3 moles of hydrogen per mole of $C_{10}H_{10}$. This resin, after exposure outdoors in an unshaded location for a period of 18 months was substantially unchanged and developed no color. Samples of the unhydrogenated polymer developed a yellow color. This hydrogenated polymer of 1,4-dihydronaphthalene also showed substantially no development of color or other change in properties when exposed to an intense ultraviolet radiation for four hours. In this test the sample was placed 7½ inches from the source of ultraviolet light, which consisted of a "Uviarc" quartz mercury vapor arc lamp (manufactured by the General Electric Company) operating on a 110 volt D. C. current of 4 amperes. This lamp was a vertical type, having a vertical arc tube ⅝ inch inside diameter and an arc length of 3 inches. Samples of the unhydrogenated polymer developed a yellow color after a few minutes exposure in the same ultraviolet light test. The above hydrogenated resin also suffered no appreciable change when heated to 100° C. for 120 hours.

In addition to the above described improvements caused by the hydrogenation, the hydrogenated resins differ slightly from the unhydrogenated material in respect to solubility in various organic solvents. Generally, the hydrogenation increases the solubility in hydrocarbons but decreases the solubility in oxygenated solvents such as esters or ethers.

In the appended claims the term "dihydronaphthalene homologue" is intended to include dihydronaphthalene itself, as the first member of the homologous series. The other homologues include the various alkyl derivatives of dihydronaphthalene, e. g. methyl dihydronaphthalene, ethyl dihydronaphthalene, dimethyl dihydronaphthalene and so on, which may be polymerized to resinous materials according to the method of the above mentioned U. S. patent.

I claim:

1. The process comprising hydrogenating a resinous polymer of dihydronaphthalene.
2. The process comprising hydrogenating a resinous polymer of 1,4-dihydronaphthalene.
3. The process comprising hydrogenating a resinous polymer of 1,2-dihydronaphthalene.
4. The process comprising reacting a solid, resinous polymer of dihydronaphthalene with hydrogen.
5. The process comprising reacting a solid, resinous polymer of 1,4-dihydronaphthalene with hydrogen.
6. The process comprising reacting a resinous polymer of dihydronaphthalene homologue with hydrogen.
7. The process comprising reacting a resinous polymer of dihydronaphthalene homologue with hydrogen until at least 2.5 moles of hydrogen per mole of $C_{10}H_{10}$ have been absorbed.
8. The process comprising reacting a solid, resinous polymer of dihydronaphthalene with hydrogen until 2.5 to 3.25 moles of hydrogen per mole of $C_{10}H_{10}$ have been absorbed.
9. A hydrogenated, resinous polymer of a dihydronaphthalene homologue.
10. A light stable, colorless, hydrogenated, resinous polymer of dihydronaphthalene.
11. A light stable, colorless, hydrogenated, resinous polymer of 1,4-dihydronaphthalene.
12. A colorless, transparent, hydrogenated, resinous polymer of dihydronaphthalene which is stable to ultraviolet light radiation.
13. A solid, colorless, transparent, hydrogenated, resinous polymer of 1,4-dihydronaphthalene which remains substantially colorless after being exposed for four hours to ultraviolet light radiated from a quartz mercury vapor arc lamp.

HAROLD S. HOLT.